United States Patent
Dortmund et al.

(10) Patent No.: US 11,184,856 B2
(45) Date of Patent: Nov. 23, 2021

(54) POWER OPTIMIZATION FOR CHANNEL STATE REPORTS IN A WIRELESS COMMUNICATION NETWORK

(71) Applicant: Apple Inc., Cupertino, CA (US)

(72) Inventors: Sven Dortmund, Essen (DE); Mathias Kurth, Dresden (DE); Matthias Hofmann, Freital (DE); Sabine Roessel, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/745,999

(22) PCT Filed: Jun. 2, 2016

(86) PCT No.: PCT/EP2016/062528
§ 371 (c)(1),
(2) Date: Jan. 19, 2018

(87) PCT Pub. No.: WO2017/016715
PCT Pub. Date: Feb. 2, 2017

(65) Prior Publication Data
US 2018/0213482 A1    Jul. 26, 2018

(30) Foreign Application Priority Data
Jul. 27, 2015    (DE) .................. 10 2015 009 779.2

(51) Int. Cl.
*H04W 52/02*    (2009.01)
*H04W 52/28*    (2009.01)
(Continued)

(52) U.S. Cl.
CPC ...... *H04W 52/0251* (2013.01); *H04B 7/0626* (2013.01); *H04W 24/10* (2013.01);
(Continued)

(58) Field of Classification Search
None
See application file for complete search history.

(56) References Cited

U.S. PATENT DOCUMENTS

| 2004/0253955 | A1* | 12/2004 | Love | H04W 52/42 455/442 |
| 2007/0066242 | A1* | 3/2007 | Yi | H04B 17/382 455/69 |

(Continued)

FOREIGN PATENT DOCUMENTS

| EP | 2782409 A1 | 9/2014 |
| GB | 2494499 A | 3/2013 |

(Continued)

OTHER PUBLICATIONS

International Search Report based on application No. PCT/EP2016/062528 (3 pages) dated Aug. 1, 2016 (Reference Purpose Only).

(Continued)

*Primary Examiner* — Gregory B Sefcheck
*Assistant Examiner* — Suk Jin Kang
(74) *Attorney, Agent, or Firm* — Kowert, Hood, Munyon, Rankin & Goetzel, P.C.

(57) ABSTRACT

This disclosure relates to a method for reducing power consumption of a first device for use in a wireless communication system. The first device receives a signal within a first reference sub-frame of a radio channel. The device determines whether to use the signal for obtaining channel state information to be reported to a second device within a reporting sub-frame, or whether to receive and use a second signal within a second reference sub-frame of the radio channel for obtaining channel state information to be reported to the second device within said predetermined later sub-frame. Based on this determination, the first device reports channel state information obtained based on the signal received within said first reference sub-frame or said (Continued)

second signal within said second reference sub-frame to the second device within said reporting sub-frame.

21 Claims, 8 Drawing Sheets

(51) Int. Cl.
| | |
|---|---|
| *H04W 64/00* | (2009.01) |
| *H04W 76/28* | (2018.01) |
| *H04B 7/06* | (2006.01) |
| *H04W 24/10* | (2009.01) |

(52) U.S. Cl.
CPC ....... *H04W 52/282* (2013.01); *H04W 64/006* (2013.01); *H04W 76/28* (2018.02); *Y02D 30/70* (2020.08)

(56) References Cited

U.S. PATENT DOCUMENTS

| | | | | |
|---|---|---|---|---|
| 2008/0287155 A1* | 11/2008 | Xu | H04L 5/0039 | 455/522 |
| 2009/0075599 A1* | 3/2009 | Baker | H04L 1/0025 | 455/67.14 |
| 2009/0143091 A1* | 6/2009 | Kim | H04W 52/146 | 455/522 |
| 2009/0170437 A1* | 7/2009 | Bhattad | H04L 1/0026 | 455/63.1 |
| 2009/0268695 A1* | 10/2009 | Zhao | H04L 5/0048 | 370/336 |
| 2011/0292854 A1* | 12/2011 | Terry | H04L 5/001 | 370/311 |
| 2012/0076040 A1* | 3/2012 | Hoshino | H04W 24/10 | 370/252 |
| 2012/0082049 A1* | 4/2012 | Chen | H04W 24/10 | 370/252 |
| 2012/0093000 A1* | 4/2012 | Jeong | H04L 5/0057 | 370/241 |
| 2012/0213137 A1* | 8/2012 | Jeong | H04W 52/0212 | 370/311 |
| 2012/0300641 A1* | 11/2012 | Chen | H04L 1/0027 | 370/241 |
| 2013/0194990 A1* | 8/2013 | Banister | H04W 24/10 | 370/311 |
| 2013/0223307 A1* | 8/2013 | Ohlsson | H04W 52/0216 | 370/311 |
| 2013/0235742 A1* | 9/2013 | Josiam | H04W 24/10 | 370/252 |
| 2013/0308508 A1* | 11/2013 | Ji | H04W 88/02 | 370/311 |
| 2013/0308509 A1* | 11/2013 | Ji | H04W 88/02 | 370/311 |
| 2013/0315120 A1* | 11/2013 | Yu | H04W 52/0216 | 370/311 |
| 2014/0022909 A1* | 1/2014 | Mahmoud | H04L 1/0026 | 370/241 |
| 2014/0029556 A1* | 1/2014 | Hoshino | H04W 24/10 | 370/329 |
| 2014/0105049 A1* | 4/2014 | Kim | H04W 24/10 | 370/252 |
| 2014/0198677 A1* | 7/2014 | Xu | H04L 1/0026 | 370/252 |
| 2014/0269453 A1* | 9/2014 | Papasakellariou | H04B 7/2643 | 370/280 |
| 2014/0334319 A1* | 11/2014 | Kubota | H04W 24/08 | 370/252 |
| 2014/0376437 A1* | 12/2014 | Ji | H04W 52/0251 | 370/311 |
| 2015/0071272 A1* | 3/2015 | Vermani | H04B 7/0621 | 370/338 |
| 2015/0103794 A1* | 4/2015 | Hoshino | H04W 24/10 | 370/329 |
| 2015/0117284 A1* | 4/2015 | Baldemair | H04L 1/0026 | 370/311 |
| 2015/0162967 A1* | 6/2015 | Jeong | H04L 5/0057 | 370/329 |
| 2015/0163745 A1* | 6/2015 | Kim | H04W 52/0235 | 370/311 |
| 2015/0181526 A1* | 6/2015 | Lee | H04W 52/0241 | 370/311 |
| 2015/0195734 A1* | 7/2015 | Chen | H04W 24/10 | 370/252 |
| 2016/0081023 A1* | 3/2016 | Ji | H04W 88/02 | 370/311 |
| 2016/0135070 A1* | 5/2016 | Lee | H04L 5/0053 | 370/252 |
| 2016/0142189 A1* | 5/2016 | Shin | H04L 5/0048 | 370/329 |
| 2016/0219518 A1* | 7/2016 | Zhao | H04W 52/0225 | |
| 2016/0262174 A1* | 9/2016 | Fujishiro | H04J 11/0053 | |
| 2016/0278047 A1* | 9/2016 | Hoshino | H04W 24/10 | |
| 2016/0338064 A1* | 11/2016 | Kuo | H04W 72/0453 | |
| 2016/0360420 A1* | 12/2016 | Liu | H04L 5/0057 | |
| 2017/0070334 A1* | 3/2017 | Hammarwall | H04L 1/0026 | |
| 2017/0070905 A1* | 3/2017 | Li | H04W 24/10 | |
| 2017/0078071 A1* | 3/2017 | Pan | H04W 24/10 | |
| 2017/0105179 A1* | 4/2017 | Kusashima | H04W 52/30 | |
| 2017/0126299 A1* | 5/2017 | Wei | H04W 24/10 | |
| 2017/0126356 A1* | 5/2017 | Xu | H04L 1/0026 | |
| 2017/0195028 A1* | 7/2017 | Shimezawa | H04W 24/10 | |
| 2017/0202025 A1* | 7/2017 | Ouchi | H04W 16/32 | |
| 2017/0347270 A1* | 11/2017 | Iouchi | H04W 16/14 | |
| 2018/0019855 A1* | 1/2018 | Zhang | H04L 1/00 | |
| 2018/0048498 A1* | 2/2018 | Stern-Berkowitz | H04L 5/0048 | |
| 2018/0049186 A1* | 2/2018 | Hong | H04L 5/0032 | |
| 2018/0098287 A1* | 4/2018 | Ang | H04W 76/28 | |
| 2018/0103387 A1* | 4/2018 | Cheng | H04L 69/323 | |
| 2018/0123744 A1* | 5/2018 | Nogami | H04W 52/146 | |
| 2018/0131427 A9* | 5/2018 | Nimbalker | H04W 72/042 | |
| 2018/0212739 A1* | 7/2018 | Kim | H04B 7/06 | |
| 2018/0213491 A1* | 7/2018 | Liu | H04W 56/0015 | |
| 2018/0213530 A1* | 7/2018 | Mochizuki | H04W 72/04 | |
| 2018/0220458 A1* | 8/2018 | Ouchi | H04J 11/00 | |
| 2018/0234949 A1* | 8/2018 | Hoshino | H04W 24/10 | |
| 2018/0270735 A1* | 9/2018 | Dinan | H04W 48/08 | |
| 2018/0279149 A1* | 9/2018 | Li | H04W 24/10 | |
| 2018/0302814 A1* | 10/2018 | Yi | H04W 48/16 | |
| 2018/0324791 A1* | 11/2018 | Nogami | H04W 16/32 | |
| 2019/0044685 A1* | 2/2019 | Nimbalker | H04W 72/042 | |
| 2019/0223035 A1* | 7/2019 | You | H04W 72/14 | |

FOREIGN PATENT DOCUMENTS

| | | |
|---|---|---|
| WO | 2007130011 A1 | 11/2007 |
| WO | 2011149920 A2 | 12/2011 |

OTHER PUBLICATIONS

German Office Action based on application No. 10 2015 009 779.2 (7 pages) dated Mar. 15, 2016 (Reference Purpose Only).

* cited by examiner

POWER OPTIMIZATION FOR CHANNEL STATE REPORTS IN A WIRELESS COMMUNICATION NETWORK

RELATED APPLICATIONS

The present application is a national stage entry according to 35 U.S.C. § 371 of PCT application No.: PCT/EP2016/062528 filed on Jun. 2, 2016, which claims priority from German application No.: 10 2015 009 779.2 filed on Jul. 27, 2015, and is incorporated herein by reference in its entirety.

FIELD

This disclosure generally relates to reducing power consumption of a mobile device, which is to report channel state information.

TECHNICAL BACKGROUND

Modern wireless communication systems sometimes implement a so-called "Discontinuous Reception" for saving battery power of mobile devices. Generally, DRX contemplates the idea of having a mobile device to be ready for data reception periodically for a given amount of time (referred to as the DRX on-duration). During other time periods than the DRX on-duration, the mobile device may not need to be ready for data reception (i.e. does not need to receive sub-frames on a radio channel), which allows the mobile device to perform power saving, e.g. by having its components required for reception. For example, the receiver circuitry and related processing resources, if available, may enter a power-safe or sleep mode, in which they consume less power than during normal operation.

The cycle of the DRX period and the DRX on-duration may be for example defined by respective given numbers of sub-frames (TTIs) of a radio channel. The DRX cycle and the DRX on-duration may be configured by the network (e.g. by a base station/access point) using control signaling. For example, the RRC (Radio Resource Control) protocol may be used for configuring the parameters of the DRC operation. DRX may be advantageously used in applications in which user data does not need to be continuously transmitted, such as Voice over LTE (VoLTE) where voice data may be periodically transmitted (e.g. every 20 ms or 40 ms).

DRX operation is available in several modern mobile communication systems, for example in 3GPP LTE (Long Term Evolution) or LTE-A (Long Term Evolution-Advanced) systems. DRX schemes may be for example implemented in the Medium Access Control (MAC) layer of the architecture. Details on the DRX operation in 3GPP-based systems may be for example found in 3GPP TS 36.321, "Evolved Universal Terrestrial Radio Access (E-UTRA); Medium Access Control (MAC) protocol specification", Version 12.5, chapter 5.7 available at http://www.3gpp.org and incorporated herein by reference Considering for exemplary purposes only a 3GPP LTE or LTE-A system, DRX functionality can be configured for a user equipment in RRC connected mode. This may be advantageous as the user equipment may thus not have to monitor the downlink (DL) radio channel(s) in every sub-frame but only cyclically during the DRX on-duration. DRX functionality may also be configured for RRC idle mode. For a summary of the RRC_CONNECTED and RRC_IDLE modes, see 3GPP TS 25.912, "Feasibility study for evolved Universal Terrestrial Radio Access (UTRA) and Universal Terrestrial Radio Access Network (UTRAN)", Version 12.0, chapter 8.4.2, available at http://www.3gpp.org and incorporated herein by reference.

As exemplified in FIG. 1, the DRX-on duration may define a given number of (consecutive) sub-frames on the radio channel that the user equipment should receive to decode the control channel information (e.g. the PDCCH (Physical Downlink Control Channel)). In case the user equipment does not receive (respectively, successfully decode) control information for the user equipment on the control channel during the DRX-on duration (and has no user data to send in the uplink), it may enter power-saving mode again and may awake not until the next DRX-on duration in the next DRX cycle (given that it does not have to wake up earlier for other reasons).

BRIEF DESCRIPTION OF THE DRAWINGS

For a more complete understanding of the embodiments described herein, and the advantages thereof, reference is now made to the following descriptions taken in conjunction with the accompanying drawings, in which similar or corresponding details are marked with the same reference numerals.

DETAILED DESCRIPTION

Figure 1:
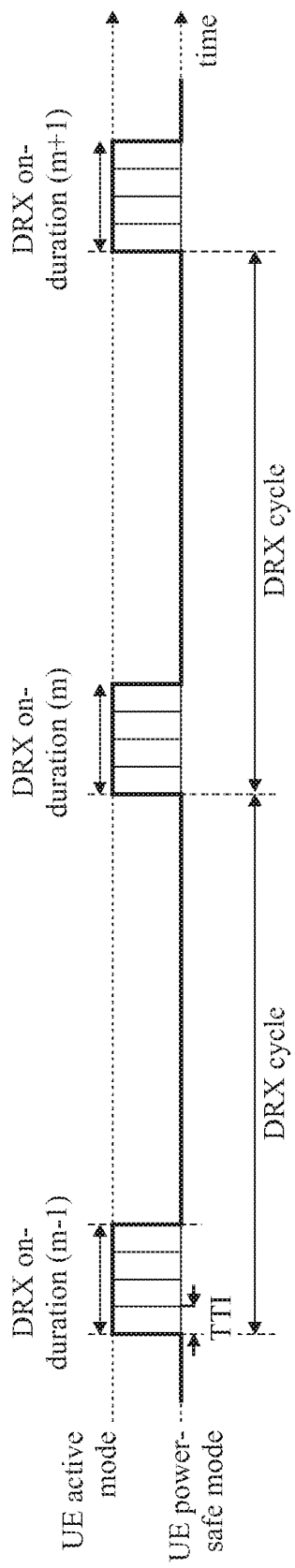
FIG. 1 shows an exemplary DRX operation within a mobile communication system.

This disclosure generally relates to power saving in a wireless or mobile communication network. One aspect of this disclosure relates to a concept for reporting channel state information using a methodology that allows reducing power consumption of a device in comparison with standard implementations.

One exemplary embodiment relates to a method for reducing power consumption of a device for use in a wireless communication system. According to this method, the device (first device) receives a signal within a first reference sub-frame of a radio channel. Note that the term sub-frame may also referred to as a transmission time interval (TTI). The first device determines whether to use the received signal for obtaining channel state information to be reported to another second device within a reporting sub-frame, or whether the first device should receive (and use) a second signal within a second reference sub-frame of the radio channel for obtaining channel state information to be reported to the second device within the predetermined later sub-frame. Depending on the determination, the first device reports channel state information obtained based on the signal received within the first reference sub-frame or the second signal within the second reference sub-frame to the second device within the reporting sub-frame.

In a further exemplary embodiment, the channel state information may be cyclically reported to the second device. In this case, the determination on which signal to use for channel state reporting may be for example based on the variation (e.g. a standard deviation, first derivative or the total variation) of the channel state information over one or more channel state reporting cycles.

In some exemplary implementations and embodiments, the first device may take the decision on which signal to use for channel state reporting upon or after having received the signal within the first reference sub-frame. For example, in one exemplary embodiment the first device may obtain channel state information based on the signal received within the first reference sub-frame. The first device may determine reporting the determined channel state information in case a value representative of the determined channel state information varies less than a threshold value from a value representative of channel state information reported in the previous reporting cycle. The value representative of the obtained channel state information could be for example, and not limited thereto, be a Channel Quality Indicator (CQI), a Signal-to-Interference Noise Ratio (SINR), Receive Signal Strength Indicator (RSSI), Reference Signal Received Power (RSRP), Reference Signal Received Quality (RSRQ), etc.

In an alternative embodiment the first device determines to report the obtained channel state information in case a value representative of the obtained channel state information varies less than a threshold value from an average value representative of channel state information reported in a set of previous reporting cycles. In yet another exemplary embodiment, the first device determines to report the obtained channel state information in case a value representative of the variation of the obtained channel state information and a value representative of channel state information reported in at least one previous reporting cycle is below a threshold value.

In other exemplary implementations and embodiments, the first device may take the decision on which signal to use for channel state reporting before receiving the signal within the first reference sub-frame. For example, in one exemplary embodiment the first device may determine to report the channel state information obtained based on the first reference sub-frame in case a value representative of channel state information reported in a first previous reporting cycle varies less than a threshold value from a value representative of channel state information reported in a second previous reporting cycle that is preceding the first previous reporting cycle.

In an alternative embodiment the first device determines to report the channel state information obtained based on the first reference sub-frame in case a value representative of the obtained channel state information varies less than a threshold value from an average value representative of channel state information reported in a set of previous reporting cycles. In another exemplary embodiment, the first device may determine to report the channel state information obtained based on the first reference sub-frame in case a variation of the value representative of channel state information reported in previous reporting cycles is lower than a threshold value.

In a further embodiment, the threshold value considered in the decision on which reference sub-frame to use for channel state reporting could be obtained based on one or more parameters. One example for such parameter may be a parameter that is indicative of the speed of movement (velocity) of the first device. For example, the SINR measured in a device is typically dependent on the velocity of the device and could thus be considered for setting the threshold value. The same applies to other measurements, such as RSSI, RSRP, or RSRQ. Hence, in some embodiments, the threshold value is thus an adaptive threshold value.

More generally, and in accordance with another embodiment, the first device takes its decision based on a parameter indicative of the speed of movement of the device. In one exemplary implementation, this may involve the first device obtaining the parameter indicative of the speed of movement of the first device.

The embodiments described herein may be practiced in a wireless communication system facilitating Discontinuous Reception (DRX) of the (mobile) device. In such scenario, it may be advantageous is the sub-frame for reporting the channel state information (reporting sub-frame) is a sub-frame within a DRX on-duration. The DRX on-duration may for example include a plurality of consecutive sub-frames (e.g. $N_{DRX}$ sub-frames, where $N_{DRX}$ is an integer number). In an exemplary embodiment, the reporting sub-frame for reporting the channel state information may be a sub-frame within a DRX on-duration following the first and second reference sub-frames. In some implementations, the reporting sub-frame may be one of the first M sub-frames within the DRX on-duration (where $M \leq N_{DRX}$ under the assumption that the duration of the processing delay—see below—is equal to or larger than the duration of the DRX on-duration).

Generally, it should be noted that the reception of and processing of a signal of a sub-frame of a channel to obtain the channel state information for reporting by means of the processing resources of the first device require some amount of time (also referred to as processing delay herein). Thus the signal based on which the channel state information is to be based must be received in good time ahead the reporting sub-frame. In conventional implementations, when DRX is employed and the reporting sub-frame is within one of the first sub-frames of a DRX on-duration, the first device may be required to receive a signal of a sub-frame prior to the start of the DRX on-duration so as to be able to timely report the channel state information in the reporting sub-frame. For this purpose, the first device may need to re-activate its circuitry (e.g. the receiver component and optionally also associated processing resources) for receiving a reference sub-frame for obtaining the channel state information earlier than indicated by the DRX cycle and thus consumes additional power. Accordingly, in an exemplary embodiment the "second reference sub-frame" mentioned herein above may be a sub-frame the signal of which would be conventionally used for determination of the channel state information within the reporting sub-frame in a conventional implementation.

As the embodiments described herein may allow for reporting channel state information based on the earlier "first reference sub-frame" no such additional power consumption may be necessary for channel state reporting. Accordingly, in case the channel state information is to be reported based on the signal of the first reference sub-frame, the first device only receives the second signal in the second reference sub-frame in case it is determined that the channel state information to be reported is to be based on this second signal.

In another exemplary embodiment, the first device may be configured for DRX operation. In DRX mode, the first device's receiver component may be periodically in connected state to receive a predetermined number of consecutive sub-frames within a DRX on-duration, and can enter a power-safe mode (also referred to a sleep mode herein) in other sub-frames than the predetermined number of consecutive sub-frames. Note that the first device might not need to put its receiver component into power-save mode in case the first device needs to receive one of the other sub-frames. The first reference sub-frame may be for example a sub-frame in which the first device's receiver component is in connected state for receiving signals of the radio channel within a DRX on-duration or is configured for reception of a signal within the one or more of the other sub-frames. For example, this may be due to the first device being configured for reception of a signal within one or more of sub-frames other than that within the DRX on-duration, e.g. for receiving a HARQ acknowledgement for an uplink transmission, for receiving a paging indicator (e.g. in case the paging cycle does not match the DRX cycle), due to a DRX inactivity timer that is set after reception of a scheduling grant, due to waiting for an uplink grant after a corresponding scheduling request in the DRX on-duration, due to serving cell measurements, etc.

In another exemplary embodiment, first reference sub-frame may be located within a DRX on-duration before, e.g. immediately before, a DRX on-duration containing the predetermined sub-frame.

Further, in another embodiment, the first device may buffer the signal received within the first reference sub-frame for later processing, e.g. for obtaining the channel state information at a later point in time.

In one exemplary embodiment, the first device is a battery-powered device. For example, the "first device" could be a mobile device, which is sometimes also referred to as mobile terminal or user equipment. A mobile device may be any kind of mobile device that is capable for wireless communication. A mobile device could thus be for example a mobile phone, a tablet device, a laptop computer, a digital camera, etc. but this list of examples is not intended to be limiting the disclosure to the use in such devices.

Further, in another embodiment, the "second device" could be for example a base station of the wireless communication system, which may also be referred to as a NodeB, eNodeB or access point.

In line with the above, another embodiment relates to a mobile device for reducing power consumption. The mobile device may be for use in a wireless communication system. The mobile device comprises a receiver (or receiver component or circuitry) to receive a signal within a first reference sub-frame of a radio channel; a processor to determine whether to use the received signal for obtaining channel state information to be reported to a second device within a reporting sub-frame, or whether to receive and use a second signal within a second reference sub-frame of the radio channel for obtaining channel state information to be reported to the second device within the predetermined later sub-frame; and a transmitter to report, based on the determination of the processor, channel state information obtained based on the signal received within the first reference sub-frame or the second signal within the second reference sub-frame to the second device within in the reporting sub-frame.

The mobile device according to another embodiment maybe further adapted to perform the steps of the method for reducing power consumption according to one of the different embodiments and implementations discussed herein.

Yet another embodiment relates to one or more computer-readable media storing instructions that, when executed by a processor of a first device, cause the first device to receive a signal within a first reference sub-frame of a radio channel; determine whether to use the received signal for obtaining channel state information to be reported to a second device within a reporting sub-frame, or whether to receive and use a second signal within a second reference sub-frame of the radio channel for obtaining channel state information to be reported to the second device within the predetermined later sub-frame; and based on on the determination, report channel state information obtained based on the signal received within the first reference sub-frame or the second signal within the second reference sub-frame to the second device within in the reporting sub-frame.

The one or more computer-readable media according to another embodiment, further store instructions that, when executed by the processor of the first device, cause the first device to perform the steps of the method for reducing power consumption according to one of the different embodiments and implementations discussed herein.

As outlined in connection with FIG. 1 above, DRX may be available in a wireless or mobile communication network for reducing the power consumption of mobile devices. During the DRX on-period (and typically also at any other time the user equipment is "active" and receives sub-frames in the downlink) the mobile device monitors a control channel (such as the PDCCH) and reports channel state information (CSI), such as CQI (Channel Quality Information), PMI (Precoding Matrix Indicator), RI (Rank Indicator) or PTI (Precoder Type Indication) to the network. Without losing generality, for the purpose of this disclosure, channel state information may generally be considered information that provides information on the instantaneous radio channel quality. The channel state information may be transmitted by the mobile device in an uplink control channel, such as the PUCCH (Physical Uplink Control Channel).

Figure 2:
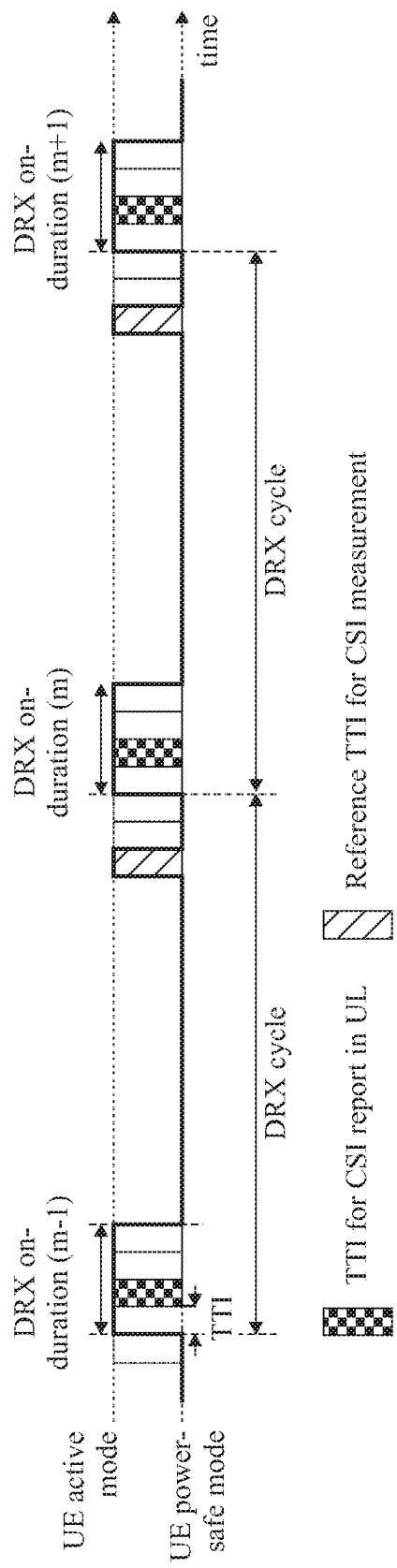
FIG. 2 shows an exemplary reporting of channel state information of a mobile device in DRX mode.

In DRX operation, the channels state information may need to be reported by the mobile device within the DRX on-duration. An example of such implementation is shown in FIG. 2, in which the mobile device is assumed—for exemplary purposes only—to report channel state information in the second TTI within the DRX on-duration of every $n^{th}$ DRX cycle (where $n \in \mathbb{N}$ and $n \geq 1$). The determination of channel state information by the mobile device requires reception of a reference sub-frame (reference TTI) based on which the channel quality can be measured, and the processing of the received signal to obtain the channel state information indicative of the channel quality for the monitored radio channel, which requires some processing time (processing delay) at the mobile terminal before the channel state information can be reported. This processing delay is typically in the range of several TTIs or milliseconds (e.g. in 3GPP LTE and LTE-A systems, a processing delay of 4 ms, equivalent to 4 TTIs is assumed).

Assuming a processing delay of 4 TTIs and the channel state information to be reported in the second TTI of the DRX on-duration, as exemplified in FIG. 2, this means that in a conventional implementation the mobile device may need to receive the sub-frame (reference sub-frame) that is three TTIs earlier than the start the DRX on-duration, and thus the mobile device may need to leave a power-saving mode at least for this reference sub-frame. Furthermore, as the channel state information typically provides an instantaneous measure of the channel quality, it may be preferable to perform the CSI measurement based on a sub-frame that is as close as possible to the reporting TTI, as exemplified in FIG. 2.

Figure 3:
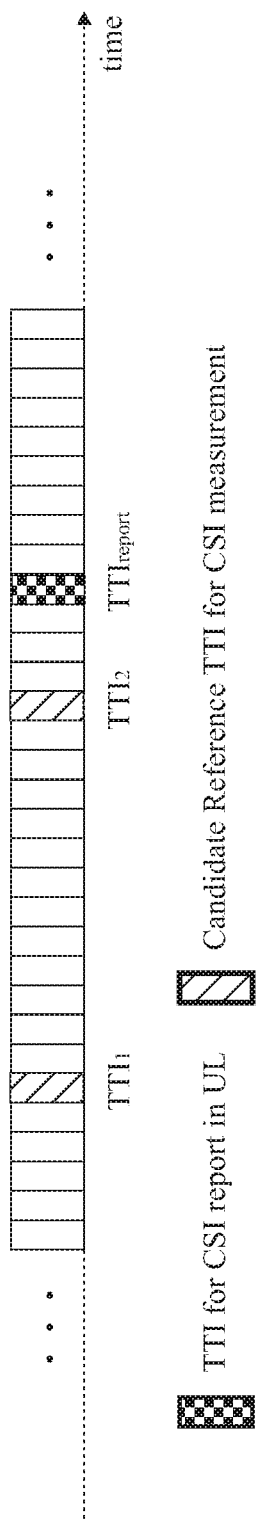
FIG. 3 shows an exemplary reporting of channel state information by a mobile device according to an embodiment.

An embodiment will now be described in connection with FIG. 3. FIG. 3 shows sub-frames on a radio cannel, wherein two sub-frames ($TTI_1$ and $TTI_2$) are marked as candidate reference sub-frames the signal of which can be used for obtaining channel state information to be transmitted in the indicated reporting sub-frame ($TTI_{report}$).

As illustrated in FIG. 3, it is assumed that the mobile device receive sub-frame $TTI_1$. The mobile device determines, whether to use the received signal of sub-frame $TTI_1$ for obtaining channel state information to be reported within a reporting sub-frame $TTI_{report}$, or whether to receive and use a second signal within the second sub-frame $TTI_2$ of the radio channel for obtaining channel state information to be reported to the second device within said predetermined sub-frame $TTI_{report}$. Depending on this determination by the mobile device, the mobile device reports channel state information obtained based on the signal received within sub-frame $TTI_1$ or said second signal within sub-frame $TTI_2$ to the second device within said reporting sub-frame $TTI_{report}$.

$TTI_1$ may be a sub-frame that the mobile device is required to receive for any specific reason. For example, the mobile device may need to receive the sub-frame because it is scheduled or configured to receive a transmission within sub-frame $TTI_1$ (e.g. a downlink transmission or an HARQ ACK (Hybrid Automatic Repeat reQuest Acknowledgment) for a previous uplink (UL) transmission by the mobile device). Another example may be that the mobile device may need to receive the sub-frame because it is has to receive a paging channel within sub-frame $TTI_1$. In another example sub-frame $TTI_1$ is a sub-frame in which the mobile device receives an uplink grant after a corresponding scheduling request. In another example, sub-frame $TTI_1$ may be a sub-frame in the "active time" in which the mobile device is required to monitor the downlink radio channel due to a DRX inactivity timer having been set after reception of a scheduling grant within the DRX on-duration. Please note that this list of possibilities is not exhausting and meant to be limiting.

$TTI_2$ may be for example the latest (in consideration of the processing delay) sub-frame before the reporting sub-frame $TTI_{report}$ the mobile device would need to receive in order to be able to timely determine the channel state information for reporting in the reporting sub-frame $TTI_{report}$. In contrast to sub-frame $TTI_1$, the mobile device may not be required to receive sub-frame $TTI_2$ so that the mobile device may put some of its (receiving) component(s) into a power-saving mode in this sub-frame (if it is not to use sub-frame $TTI_2$ as a reference sub-frame for CSI reporting).

$TTI_{report}$ may be a sub-frame in which the mobile device is to transmit channel state information (reporting sub-frame). The reporting sub-frame may be for example configured by RRC control signaling. For example, the reporting sub-frame may be one of the TTIs within a DRX on-duration as outlined in further detail in the example in connection with FIG. 4 below, but this disclosure is not limited to the use of DRX.

Figure 4:
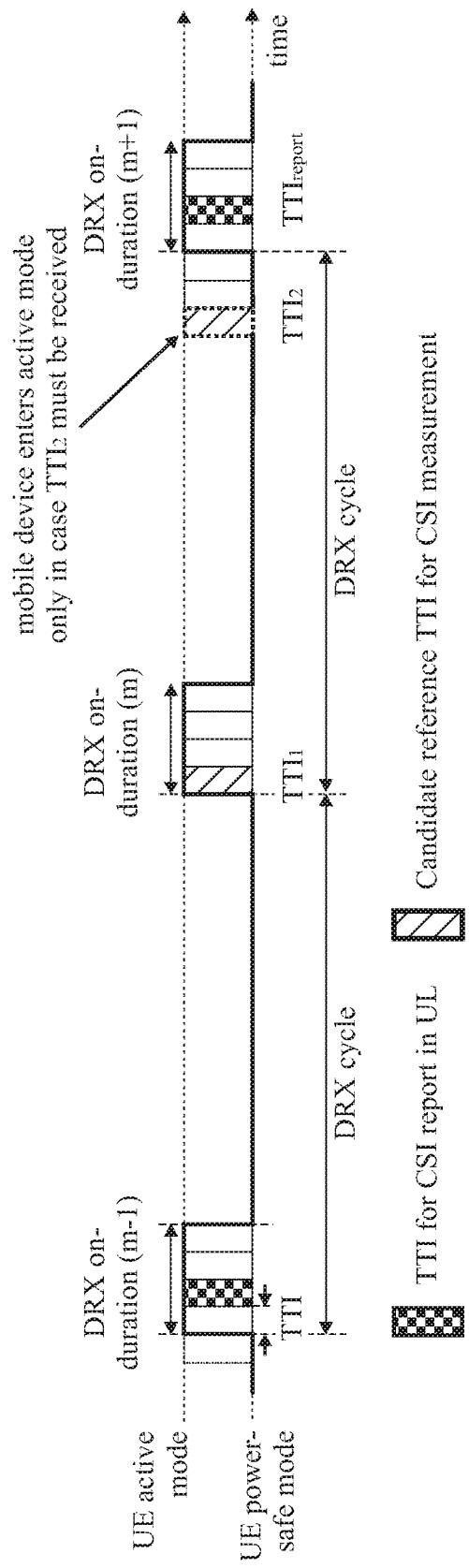
FIG. 4 shows an exemplary reporting of channel state information by a mobile device in DRX mode according to an embodiment.

FIG. 4 shows another exemplary embodiment. In this embodiment, it is assumed that the mobile device is in DRX mode. Without losing generality, it is further assumed that the reporting cycle for channel state information is two (or more) DRX cycles. Note that of course the CSI reporting cycle may be the same as the DRX cycle. The example of FIG. 3 is similar to the example in FIG. 4, except for some implications from DRX operation. For example, in FIG. 4 sub-frame $TTI_1$ may be a sub-frame (e.g. the first sub-frame) of the DRX transmission cycle m, which is the DRX cycle preceding the DRX cycle m+1 in which the channel state is reported. The channel state information is reported in the DRX on-duration (e.g. the first sub-frame) of the DRX cycle m+1. In the present example the number of TTIs in a DRX cycle is four, but this is only exemplary and there may be also only 2 or 3 TTIs or 5, 6, . . . , 10 TTIs in each DRX on-duration. The number of TTIs within a DRX on-duration may depend on the DRX cycle duration. The longer the DRX cycle, the more TTIs are usually comprised within the DRX on-cycle. In a VoLTE scenario, where the DRX cycle is for example 20 ms or 40 ms, there are typically 4 or 5 TTIs in each DRX on duration.

As illustrated in FIG. 4, it is assumed that the mobile device receive sub-frame $TTI_1$ within the DRX on-duration of DRX cycle m. The mobile device decides, whether to use the received signal of sub-frame $TTI_1$ for determining channel state information to be reported within a reporting sub-frame $TTI_{report}$ in the DRX on-duration of DRX cycle m+1, or whether to receive and use a second signal within the second sub-frame $TTI_2$ of the radio channel for determining channel state information to be reported to the second device within said predetermined sub-frame $TTI_{report}$. Depending on this decision, the mobile device reports channel state information obtained based on the signal received within sub-frame $TTI_1$ or said second signal within sub-frame $TTI_2$ to the second device within said reporting sub-frame $TTI_{report}$.

Assuming that the mobile device would not receive or send data in DRX cycle m, and in case the channel state is reported based on sub-frame $TTI_1$, the mobile device could enter a power-saving state after the DRX on-duration of the DRX cycle m and would only have to go back to active state for the first sub-frame in the DRX cycle m+1. Accordingly, in contrast to the conventional solution in FIG. 2, the mobile device does not need to wake up for sub-frame $TTI_2$ and may thus conserve battery power.

When employing embodiment of FIG. 4 in the context of Voice over LTE (VOLTE), the mobile device the DRX cycle could be set to 20 ms or 40 ms (e.g. 20 or 40 TTIs for a TTI=1 ms). The reporting cycle for the CSI may be set equal to the DRX cycle or may be two times or three times the DRX cycle. The reporting cycle may be for example defined by the network using the CQI Configuration Index that is signaled to the mobile device in the control plane.

Figure 5:
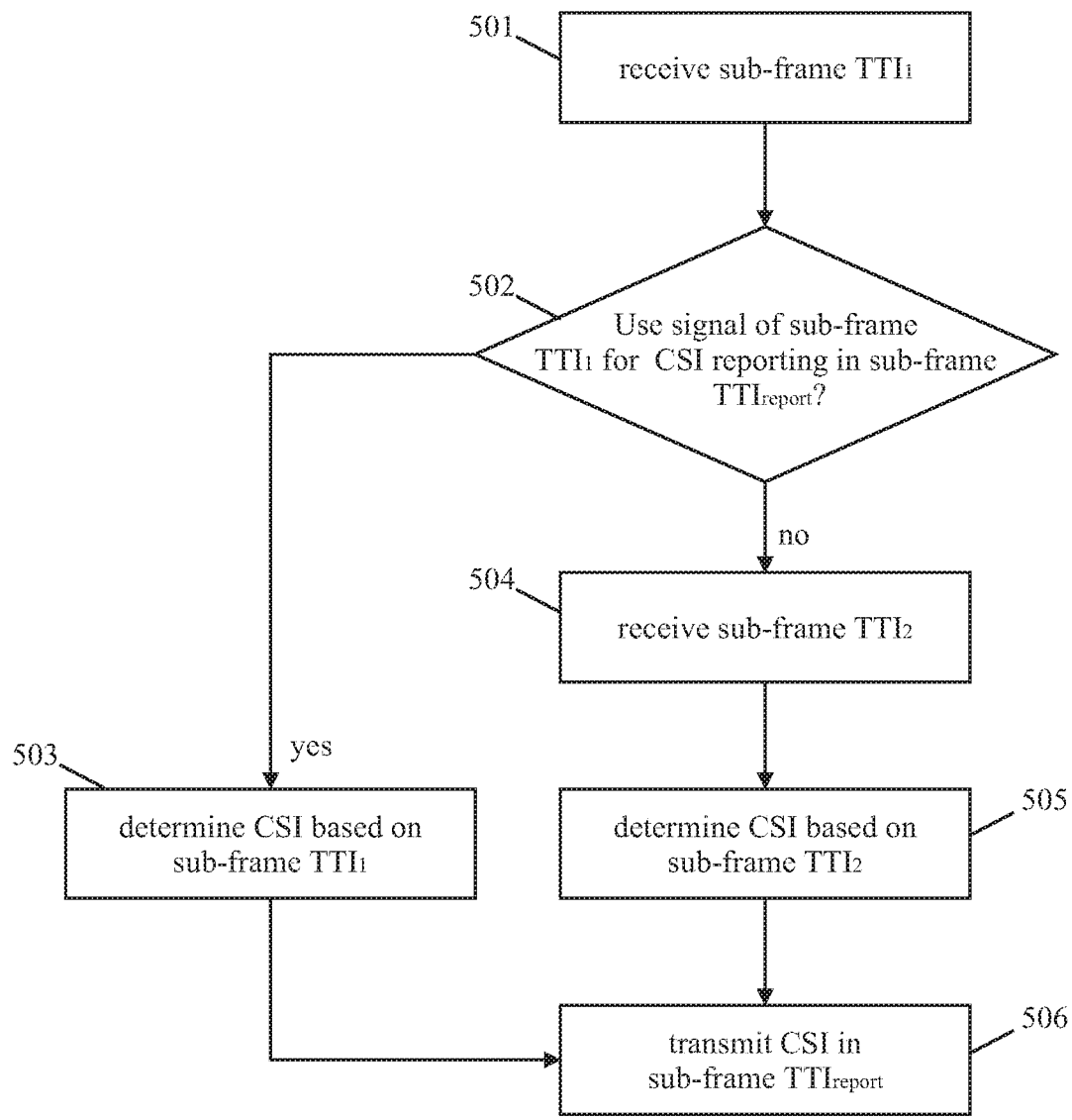
FIGS. 5 to 9 show different flow charts of a procedure for reporting channel state information by a mobile device according to different exemplary embodiments.

FIG. 5 shows a flow chart of an exemplary procedure for reporting channel state information in accordance with an embodiment. The exemplary implementation of FIG. 5 may be used in conjunction with the implementations of FIG. 3 or 4. In FIG. 5 it is assumed that the determination 502 on which of sub-frames $TTI_1$ and $TTI_2$ to use for CSI reporting is taken upon or shortly after receiving 501 sub-frame $TTI_1$. The decision may be based on one or more criteria, as will be outlined below in further detail. In case the sub-frame $TTI_1$ is to be used, the mobile device determines 503 the channel state information to report and report 506 them in the reporting sub-frame $TTI_{report}$. Otherwise, the mobile device receives 504 sub-frame $TTI_2$, determines 505 the channel state information based on sub-frame $TTI_2$ and reports 506 them in the reporting sub-frame $TTI_{report}$.

Figure 6:
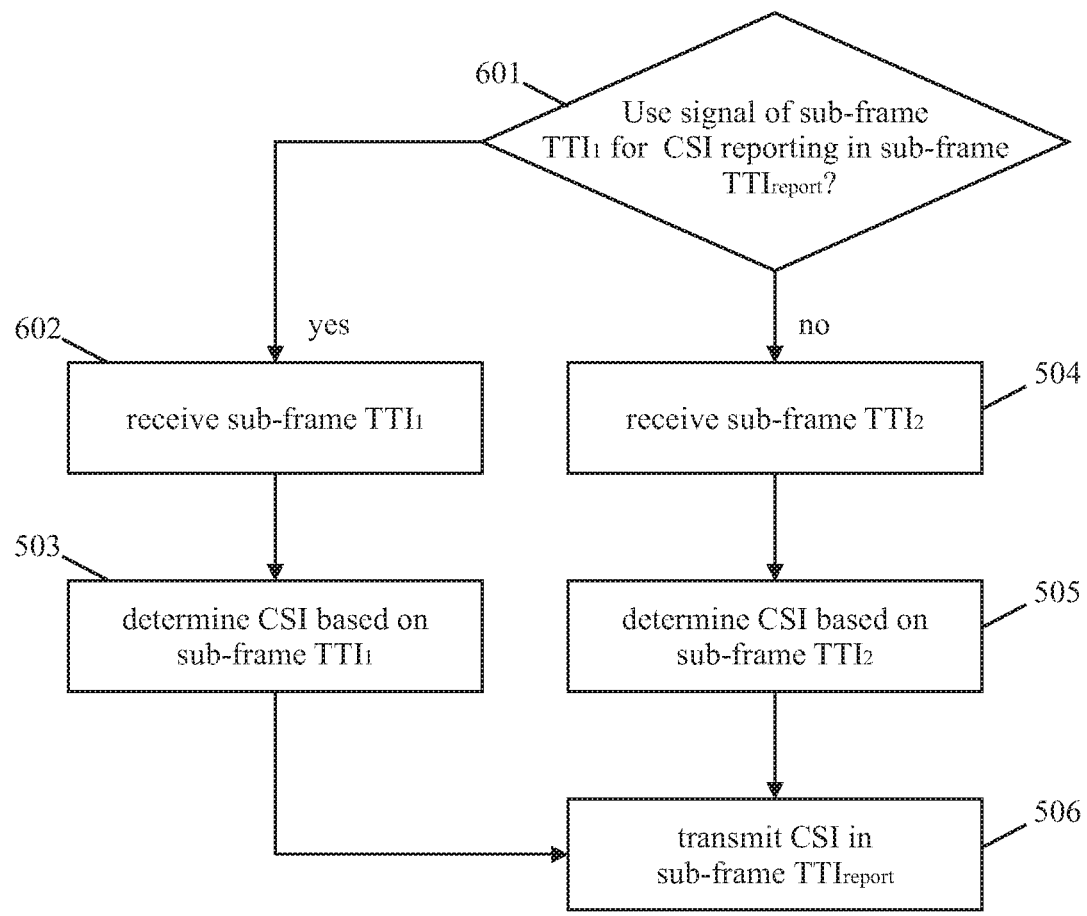

FIG. 6 shows another flow chart of an exemplary procedure for reporting channel state information in accordance with an embodiment. The exemplary implementation of FIG. 6 may be used in conjunction with the implementations of FIG. 3 or 4. In FIG. 6 the determination 601 on which of sub-frames $TTI_1$ and $TTI_2$ to use for CSI reporting may be taken by the mobile device before receiving 503, 602 sub-frame $TTI_1$. The decision may be based on one or more criteria, as will be outlined below in further detail. In case sub-frame $TTI_1$ is to be used, the mobile device receives 602 sub-frame $TTI_1$, determines 503 the channel state information to report based on sub-frame $TTI_1$ and reports 506 them in the reporting sub-frame $TTI_{report}$. Otherwise, the mobile device receives 504 sub-frame $TTI_2$, determines 505 the channel state information based on sub-frame $TTI_2$ and reports 506 them in the reporting sub-frame $TTI_{report}$.

Note that in case the mobile device determines 601 that sub-frame $TTI_2$ is to be used as a reference sub-frame for reporting the channel state information, step 602 may be executed nonetheless, e.g. when employing the implementation of FIG. 6 with the DRX operation as shown in FIG. 4. In this case, sub-frame $TTI_1$ may be within a DRX on-duration so that the mobile device is required to receive the sub-frame $TTI_1$.

Figure 7:
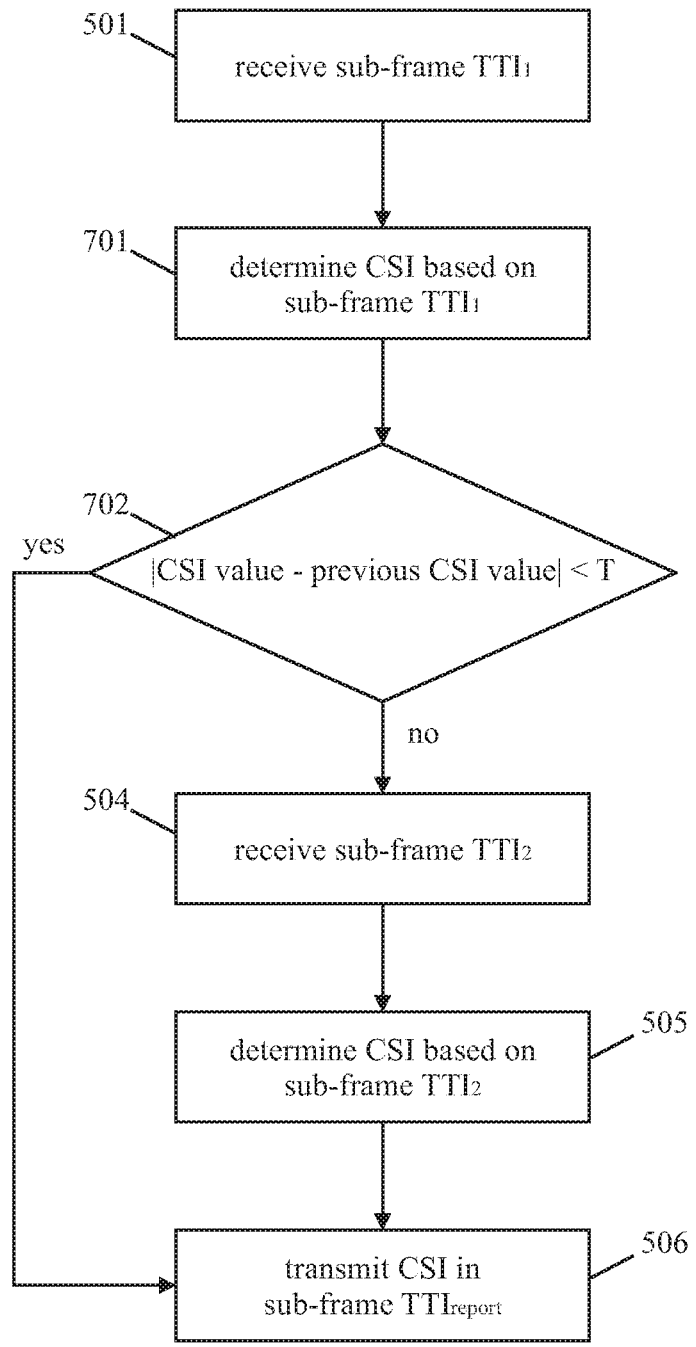

As noted above, there may be several criteria based on which the mobile device determines, which of sub-frame $TTI_1$ and $TTI_2$ to use for CSI reporting. For example, revisiting and implementation as exemplified in FIG. 5 where it is assumed that the decision on which of sub-frames $TTI_1$ and $TTI_2$ to use for CSI reporting is taken upon or shortly after receiving sub-frame $TTI_1$ decision taking by the mobile device could be implemented as shown in FIG. 7. Similar to FIG. 5, the exemplary implementation of FIG. 7 may be used in conjunction with the implementations of FIG. 3 or 4. In the exemplary embodiment of FIG. 7 is assumed—for exemplary purposes only—that the mobile device reports CQI values as channel state information. In general, the CQI values may be a wideband CQI values or a sub-band CQI values. Furthermore, the mobile device stores the latest one or more (e.g. up to 3 or 4) CQI values reported to the network. Considering a DRX configuration as in FIG. 4, the mobile device thus stores the CQI values reported the latest one or more DRX cycles m, m−1, . . . prior to the next DRX cycle m+1 in which the new CQI value is to be reported in the reporting sub-frame $TTI_{report}$. The CQI values may be for example stored in a memory of the mobile device 1003. The memory portion for storing the CQI values may be organized similar to a FIFO buffer and stores $N \in [1, 2, 3, 4]$ elements. Alternatively, the signal received within the reference sub-frame could be stored/buffered by the mobile device, for example in case the determination 502, 601, 702 is taken by the mobile device at a later point in time.

Similar to FIG. 5, the mobile terminal may first receive 501 the sub-frame $TTI_1$ and determines 701 the CQI values based on the signal received within sub-frame $TTI_1$. The obtained CQI value may be denoted $CQI_{TT1}$. The mobile device compares the obtained CQI value $CQI_{TT1}$ with the last reported CQI value (e.g. the CQI value reported in the last DRX cycle in case of DRX operation as in FIG. 4). If the absolute value of the difference of the two compared CQI values is below a threshold T, the CQI values obtained based on the signal in sub-frame $TTI_1$ is reported 506, otherwise, the mobile device receives 602 sub-frame $TTI_1$, determines 503 the channel state information to report based on sub-frame $TTI_1$ and reports 506 them in the reporting sub-frame $TTI_{report}$.

The threshold value T may be for example statically configured or may be dynamically adapted. In one exemplary embodiment, T=1 or 2, i.e. the new CQI value obtained based on sub-frame $TTI_1$ may not deviate more than by 1 or 2 from the previously reported CQI value. Generally, in all embodiments herein, the CQI values may be for example obtained based on a SINR calculated based on the signal of the respective reference sub-frame. Assuming a SINR in the range of −6 dB and 20 dB and mapping this range to a total of 16 CQI values (i.e. a 4-Bit value), the difference between two CQI values is approx. 1.5 to 2 dB. Hence, setting the T=1 or T=2 would allow the mobile terminal to report a CQI calculated based on sub-frame $TTI_1$ if the SINR in sub-frame $TTI_1$ does not deviate more than approx. 1.5 to 2 dB, respectively, 3 to 4 dB from the SINR in the sub-frame of the previously reported CQI value. Note that in this example, the mobile device may only need to store the last reported CQI value.

In an alternative implementation, the procedure could be designed similar to FIG. 5, but instead of comparing CQIs, the mobile device could compare the SINR of sub-frame $TTI_1$, with a SINR in the sub-frame of the previously reported CQI value in step 502. Accordingly, instead of storing a CQI, the mobile device would need to store the SINR in the sub-frame of the previously reported CQI value.

In another alternative implementation, instead of comparing the CQI/SINR of the sub-frame $TTI_1$ with the CQI/SINR of the sub-frame of the previously reported CQI value, the mobile device could also compare the CQI/SINR of the sub-frame $TTI_1$ with the average CQI/SINR of the sub-frames of the previously last N reported CQI values. For example, $N \in [2, 3, 4]$.

The determination of the channel state information may be—in some embodiments—based on the SINR that is measured for the given reference sub-frame. Assuming low interference conditions, the SINR is primarily influenced by fast (small scale) and slow (large scale) fading effects of each individual channel. The SINR may be obtained for a given carrier or a sub-band thereof. The measurement is performed over the entire bandwidth of the component carrier or the sub-band (which are both examples of a radio channel) in the frequency domain (e.g. 5 MHz, 10 MHz, 20 MHz, or more) and the duration of a sub-frame in the time domain (e.g. 1 ms). In OFDM-based systems, such as 3GPP LTE or LTE-A, each sub-frame spans a time-frequency array of resource elements (REs)—sometimes also referred to as modulation symbols. Each of these resource elements is associated to a given fraction of the channel bandwidth in the frequency domain and a given duration (symbol duration) in the time domain and conveys a modulation symbol.

As noted above, in an OFDM-based wireless communication system in general, and particularly in 3GPP LTE and LTE-A, the SINR may be calculated based on the signal of a sub-frame. The SINR may be a "combined SINR" that combines respective SINR measurements for respective frequency points within the monitored channel and over an entire sub-frame duration. For example all SINR measurements for an entire sub-band or the entire carrier bandwidth within a TTI may be combined to obtain the SINR measure to be considered in the mobile device's decision and/or calculation of the channel state information to be reported. In case data of several individual SINR measurements is combined over an entire transmission time interval (sub-frame) and several frequency points, small scale fading and frequency selectivity of the channel may be negligible. In contrast, large scale fading describes the variability of the channel with homogeneous areas with a typical size of up to 40λ (λ representing the center frequency of the observed LTE-band), with representing the wavelength of the center frequency of the observed LTE band. Hence, for a maximum supported speed of a user equipment of 350 km/h, for example, significant large scale fading effects should be observable in an interval of about 12.7 ms for band 13 (low band—e.g. 746-768 MHz) and 4.4 ms for band 4 (high band—e.g. 2110-2155 MHz), respectively. This estimation implies that for operating a user equipment at a high band and high speed requires most recent data for CQI transmission i.e. the reference sub-frame should be as close to the reporting sub-frame as possible. Hence, assuming the LTE-defined processing delay of 4 ms, the delay of reporting on the channel state should be 4 ms.

In VoLTE scenarios using DRX it may be assumed without losing generality that many of the user will have significant lower velocities and are almost "semi-static" in terms of large scale fading, for example, when considering pedestrians or users driving the car within cities. Even when assuming a speed of the users of 100 km/h, the examined time interval increases to 44.4 ms (low band) so that samples from the previous DRX cycle (e.g. 40 ms) and recent samples should result in a comparable CQI value. For a pedestrian velocity this interval even extends to 280 ms (high band) and 800 ms (low band), so that the embodiments could even be used with longer DRX cycles.

It is apparent from the above that the mobile device's decision on which reference sub-frame is to be used for channel state reporting may be dependent on the velocity of the mobile device. Generally speaking, the faster the mobile device is moving, the closer the reference sub-frame should be to the reporting sub-frame in terms of timing. Therefore, in one embodiment, in the examples of FIGS. 5 and 6 the mobile device may consider the velocity of the device as the only one or one of several parameters in its determination 502, 601. Likewise, in the example of FIG. 7 (and also that of FIGS. 8 and 9 described below) the threshold T may be based on the velocity of the device. For example, in one example implementation, there may be at least two ranges of velocity, each of which is associated with a respective maximum number of TTIs the reference sub-frame may be earlier than the reporting sub-frame. With increasing speed of the mobile device, the respective maximum number of TTIs ($TTI_{max}$) get lower. Accordingly, in one example, determination 502, 601 of the mobile device may determine whether the reference sub-frame $TTI_1$ is too early relative to the reporting sub-frame $TTI_{report}$ (e.g. whether the TTI index of sub-frame $TTI_1$ is higher than the TTI index of sub-frame $TTI_{report}$ minus the maximum number of TTIs ($TTI_{max}$) for the given (range of) velocity.)

Figure 8:
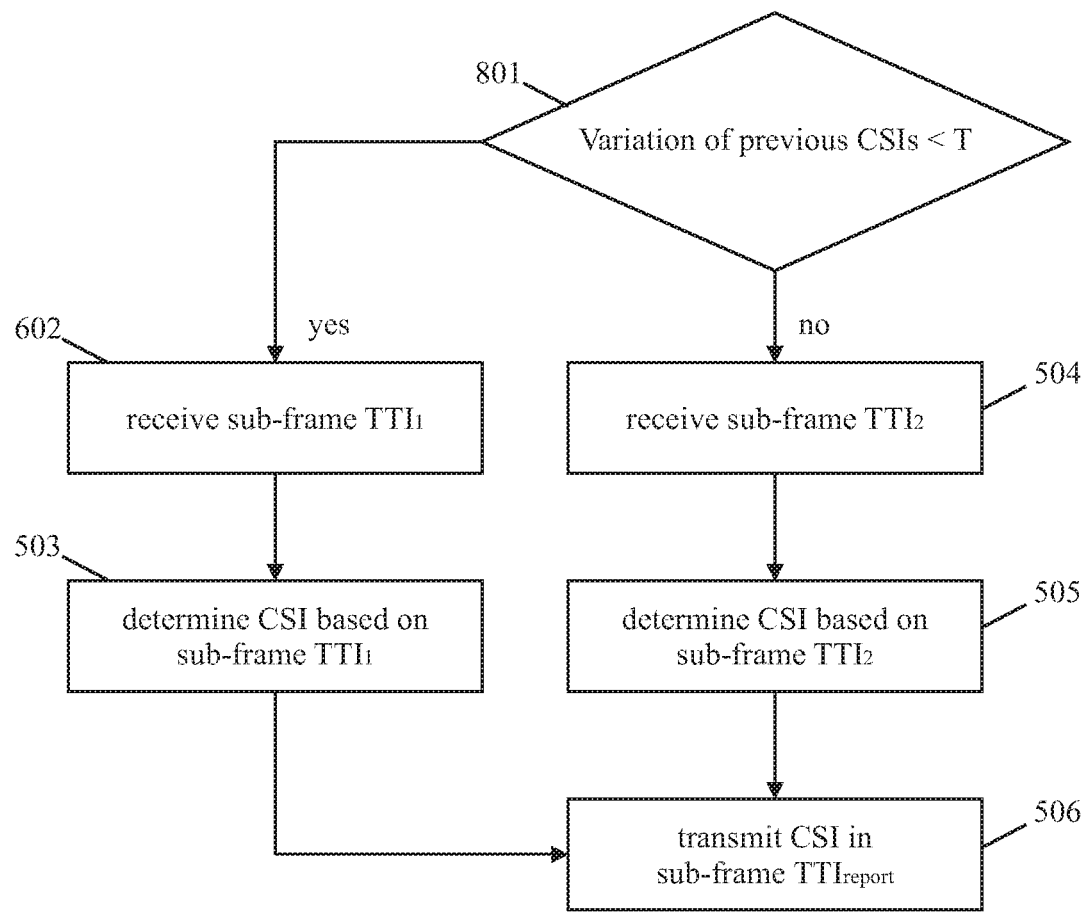

FIG. 8 shows a flow chart according to another embodiment. Similar to the example in FIG. 6, also in this embodiment the determination 601, 801 of the mobile device which reference sub-frame is to be used for determining the channel state information may be performed prior to the reception of the reference sub-frame $TTI_1$. Accordingly, the determination 801 may be based on historic information that allows the mobile device to determine, whether the reference sub-frame $TTI_1$ or reference sub-frame $TTI_2$ should be used for channel state reporting. In the example in FIG. 8, the mobile terminal considers the variation of the past N channel state information in its decision. More specifically, the mobile device checks 801 whether the variation of the latest N channel state information values, e.g. CQI values, is below a given threshold T. The variation may be for example be measured by means of the standard derivative calculated over the latest N channel state information. As noted previously, the threshold T may be adaptive and set based on the velocity of the mobile device. For example, N∈[2, 3, 4]. As described earlier the mobile device buffers the last N channel state information reported. The reported values may be for example stored in a memory of the mobile device 1003. The memory portion for storing the reported channel state values may be organized similar to a FIFO buffer and stores N∈[2, 3, 4] elements. The value of T may be, for example, in the range T∈[1,2,3].

Note that the parameterizations of the threshold value T in absolute integer numbers has been based on an assumption that there is a certain step size in between two adjacent levels of the threshold, e.g. 1.5 to 2.0 dB in the examples above. Of course the range of numbers for the threshold T may depend on the step size between two values, and in one embodiment there may be more or less values for T defined for respective (regions of) velocities.

Figure 9:
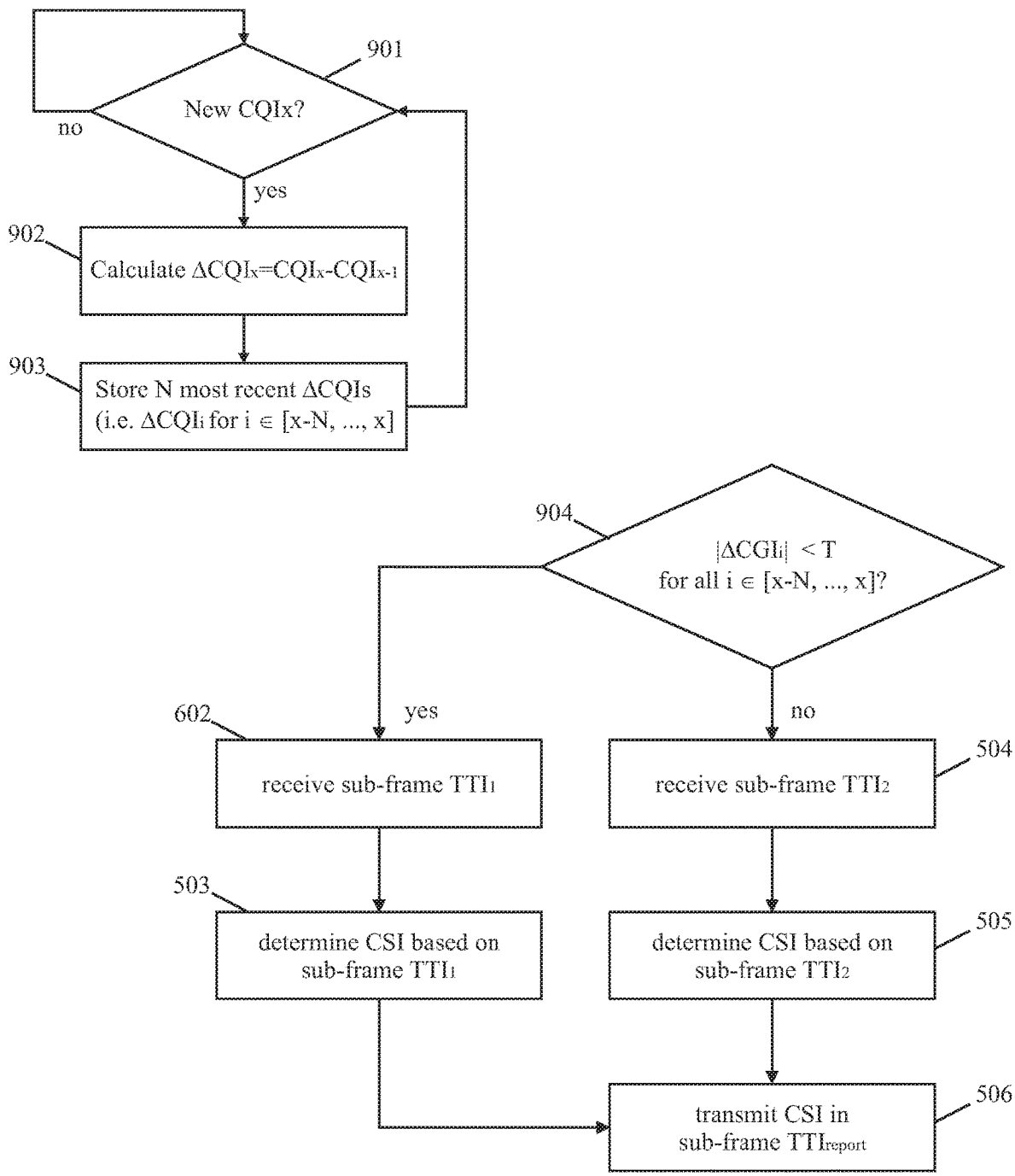

FIG. 9 shows a more detailed procedure for implementing an embodiment. The example of FIG. 9 is based on FIGS. 6 and 8 and can be used without DRX operation or with DRX operation as shown in FIGS. 3 and 4, respectively. The determination 904 by the mobile device is based on historic CQI information of the previous channel state reports. The base station maintains a history on the previous CQI values reported. For example, the mobile device could store N∈[2, 3, 4] elements previously reported in a memory 1003. The memory region storing the elements may be organized similar to or is a FIFO buffer. In the example of FIG. 9. In case there is a new $CQI_x$ 901 for reporting in a given reporting sub-frame $TTI_{report}$ the mobile device calculates 902 the difference $\Delta CQI_x$ (x is a time index indicating the position of CQIs over time) by subtracting the lastly reported $CQI_{x-1}$ from the current $CQI_x$ and stores 903 the difference $\Delta CQI_x$. The mobile device keeps the last N $\Delta CQI_i$ values, as noted above. In addition, the mobile device may also store the lastly determines (current) $CQI_x$ for calculating the next $\Delta CQI_{x+1}$.

In case of using DRX, the index x may be considered to denote the DRX cycle number and the mobile device stores the CQI of the current cycle x, i.e. $CQI_x$, and $\Delta CQI_i$, i∈[x−N, x−(N−1), . . . , x].

At a given point in time, when the mobile device takes the determination 904 on whether to report the channel state based on the signal of reference sub-frame $TTI_1$ or a later TTI, such as for example $TTI_2$. In one example implementation, this determination 904 is taken by the mobile device ahead the start of the next DRX cycle m, so as to determine whether the reference sub-frame $TTI_1$, which is a sub-frame within the DRX on-duration of cycle m, is to be considered for the calculation of a CQI that is reported in the DRX on-duration of the next cycle m+1, as exemplified in FIG. 4. The determination 904 may be for example taken at least the processing delay (e.g. 4 ms) ahead the starting sub-frame of the DRX on-duration of cycle m. The mobile device checks, whether the last N $\Delta CQI_i$ values buffered by the mobile device are all below a threshold value T. In one example implementation N∈[2, 3, 4]. The threshold T maybe static, semi-static or could dynamic. The threshold T may be for example obtained based on the velocity of the mobile device. In one example, T could be T=1 or T=2.

The channel state information in all embodiments disclosed herein may be reported by means of Radio Resource Control (RRC) signaling messages, but this disclosure is not limited to this. In 3GPP LTE and LTE-A wireless systems the RRC protocol is conventionally terminated by the base station (e.g. eNodeB) within the access network. Accordingly, channel state information, such as CQI, PMI, RI or PTI, is transmitted from the mobile device to a base station. The base station may also be denoted an access point.

Note that in the different embodiments described herein above with respect to FIGS. 5-9, the determination 502, 601, 702, 801, 904 has been sometimes characterized as the mobile device deciding between reference sub-frame $TTI_1$ or reference sub-frame $TTI_2$. In another embodiment, the determination 502, 601, 702, 801, 904 is only deciding whether the current/next candidate sub-frame $TTI_1$ the mobile device will receive is to be used for measurements to determine the channel state information for the next channel state report, but it does not "select" an alternative reference sub-frame $TTI_2$ in case it is not. If sub-frame $TTI_1$ is selected by the mobile device, the mobile device may set a reporting flag internally. The reporting flag, when set, prevents that the mobile device leaves a power-safe mode for receiving a sub-frame, e.g. sub-frame $TTI_2$, at a later point in time for channel state reporting in the next reporting sub-frame $TTI_{report}$. After reporting the channel state information, the reporting flag is reset. In case of DRX operations, each reporting cycle may have such reporting flag (m) associated with it. Note that in this case the flag does of course not have to be reset after reporting in the given cycle m.

Furthermore, in some of the embodiments above, the SINR or a combined SINR measure has been considered in the decision of the mobile device and/or for calculating the channel state information to be reported for the reference sub-frame. Note that alternatively, RSSI measurement could be considered by the mobile device. The RSSI may be indicative of the average total received power observed only in OFDM symbols containing reference symbols within a given reference sub-frame and may relate to a sub-band or a carrier.

A further alternative measurements may be the RSRP which is a RSSI-type of measurement and relates to the power of the LTE Reference Signals spread over the full bandwidth and narrowband. The 3GPP defined the RSRP as the linear average over the power contributions (in Watt) of the resource elements that carry cell-specific reference signals within the considered measurement frequency bandwidth.

Another alternative measurement that may be used by the mobile device could be the RSRQ which is a carrier-to-interference-type of measurement. The RSRQ indicates the quality of the received reference signal within a sub-frame. The 3GPP defines the RSRQ as the ratio N×RSRP/(E–UTRA carrier RSSI), where N is the number of Resource Blocks (RBs) of the E-UTRA carrier RSSI measurement bandwidth.

Embodiments of this disclosure may be implemented in a mobile device. The various embodiments described herein may be implemented by means of dedicated hardware, a software program or a combination thereof to implement the desired functionality of the respective device. Accordingly, another embodiment relates to the implementation of the above described various embodiments using hardware and software. It is recognized that a mobile device may be implemented by having computing devices (processors) execute a software program that causes the desired functionality being executed. For exemplary purposes only, a computing device or processor may be defined as is the electronic circuitry within that carries out instructions of a computer program by performing the basic arithmetic, logical, control and input/output (I/O) operations specified by the instructions. A computing device or processor may for example be one or more general purpose processors, one or more microprocessors on one or more integrated circuits (IC), one or more digital signal processors (DSP), one or more application specific integrated circuits (ASIC), one or more application specific processors (ASIP), one or more field programmable gate arrays (FPGA) or other programmable logic device(s) (PLD), etc. Some of the computing devices or processors may have an internal memory (e.g. a cache and/or registers). Some of the computing devices or processors may store the software program internally. In some embodiments, the processor may have one or more processing units or cores.

Figure 10:
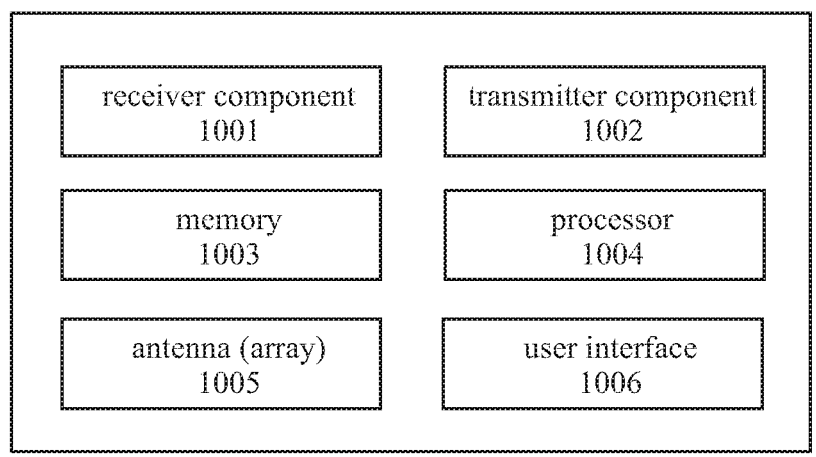
FIG. 10 shows a mobile device according to an embodiment.

FIG. 10 shows an exemplary mobile device that incorporates the principles of this disclosure. Mobile device may comprise one or more antennas and/or one or more antenna arrays 1005. Antenna arrays may be useful when implementing an embodiment in a wireless communication system that supported MIMO. Furthermore, the mobile device comprises a receiver component 1001 coupled to the antenna(s) and/or antenna array(s) 1005 to receive signals. The receiver component 1001 may be implemented by means of a dedicated receiver circuitry on an integrated circuit, optionally, together with at least some parts of the transmitter component 1002. The receiver component 1001 receives signals corresponding to respective sub-frames under control of processor 1004. The receiver component 1001 may have also some processing functionality, e.g. may include a processor. For example, the receiver component 1001 may comprise a demodulation function and decoding function to decode the demodulated symbols of the received signals. Similarly, the transmitter component 1002 of the mobile device is also coupled to the antenna(s) and/or antenna array(s) 1004 and transmits data, such as the channel state information reported by the mobile device. The transmitter component 1002 may have also some processing functionality, e.g. may include a processor. For example, the transmitter component 1002 may comprise a modulation function and coding function to encode transmission data and to modulate the encoded data to modulation symbols of a sub-frame for transmission. Note that the receiver component 1001 and transmitter component 1002 may also be combined into a transceiver component. The transceiver component may be formed by an integrated circuit. The mobile device also comprises one or more processors 1004. The processor(s) 1004 may be provided separately from other components, or may be partly incorporated therein. The processors 1004 may for example react on instructions that are stored in memory 1003 and cause the mobile device to perform the procedures as outlined in connection with the embodiments of FIGS. 3 to 9. For example, the processor(s) 1004 may execute instructions that allow the mobile terminal the logic as shown in the different flow charts herein and that allow the mobile terminal to take determinations 502, 601, 702, 801, 904, to perform calculations, such as determining the channel state information, to buffer received signals, and/or to buffer lastly reported channel state information or related parameters (e.g. SINRs) that are relevant for performing one of the different embodiments.

The various embodiments may also be performed or embodied by a combination of computing devices (processors) and software programs providing the desired functionality stored on any kind of computer readable storage media, for example RAM, EPROM, EEPROM, flash memory, registers, hard disks, CD-ROM, DVD, etc. One or more computer readable storage media may be used to store a sequence of instructions that when executed by a device that includes comprising a computing device or processor to perform one of the various embodiments thereof described herein.

It should be further noted that the individual features of the different embodiments of may individually or in arbitrary combination be subject matter to another embodiment encompassed by this disclosure.

Having thus described various embodiments, it is noted that the embodiments disclosed are illustrative rather than limiting in nature and that a wide range of variations, modifications, changes, and substitutions are contemplated in the foregoing disclosure and, in some instances, some features of the embodiments may be employed without a corresponding use of the other features.

The invention claimed is:

1. A method for reducing power consumption of a first device for use in a wireless communication system, the method comprising:
receiving a signal within a first reference sub-frame of a radio channel;
buffering the signal;
determining whether to use the buffered signal for obtaining channel state information to be reported to a second device within a reporting sub-frame, or whether to receive and use a second signal within a second reference sub-frame of the radio channel for obtaining channel state information to be reported to a second device within a predetermined sub-frame;
processing, based on the determination, the buffered signal;
determining to report the obtained channel state information when a value representative of a variation of the obtained channel state information is below a threshold value and a value representative of channel state information reported in at least one previous reporting cycle is below the threshold value; and
reporting the obtained channel state information based on the buffered signal received within the first reference sub-frame to the second device within the reporting sub-frame, wherein the reporting is cyclical.

2. The method according to claim 1, wherein the reporting sub-frame is a sub-frame within a DRX on-duration.

3. The method according to claim 2, wherein the DRX on-duration includes a plurality of consecutive sub-frames, and the reporting sub-frame is one of the first three sub-frames within said DRX on-duration.

4. The method according to claim 1, wherein said second reference sub-frame is a sub-frame of a signal which is conventionally used for obtaining the channel state information within said reporting sub-frame.

5. The method according to claim 1, further comprising receiving the second signal in said second reference sub-frame only in case it is determined that the channel state information to be reported based on the second signal in said second reference sub-frame.

6. The method according to claim 1, wherein the first device is configured for DRX operation, where a receiver component of the first device is periodically in connected state to receive a predetermined number of consecutive sub-frames within a DRX on-duration, and can enter a power-safe mode in other sub-frames than said predetermined number of consecutive sub-frames, unless the first device is configured for reception of a signal within one or more of said other sub-frames.

7. The method according to claim 6, wherein said first reference sub-frame is a sub-frame in which the first device's receiver component is in connected state for receiving signals of the radio channel within a DRX on-duration or a configured reception of a signal within said one or more of said other sub-frames.

8. The method according to claim 6, wherein said second reference sub-frame is a sub-frame in which the first device's receiver component is in connected state for a reception of a signal within said one or more of said other sub-frames.

9. The method according to claim 6, wherein the reporting sub-frame for reporting the channel state information is a sub-frame within a DRX on-duration following the first and second reference sub-frames.

10. The method according to claim 6, wherein the first reference sub-frame is within a DRX on-duration before a DRX on-duration containing the predetermined sub-frame.

11. The method according to claim 1, wherein a variation of the obtained channel state information comprises one or more difference values, each difference value based on a difference between an obtained channel state information of one channel state reporting cycle and an obtained channel state information of another channel state reporting cycle.

12. The method according to claim 1,
wherein the variation is at least one of a standard deviation of the obtained channel state information over one or more channel state reporting cycles, a first derivative of the obtained channel state information over one or more channel state reporting cycles, or a total variation of the obtained channel state information over one or more channel state reporting cycles.

13. The method of claim 1,
wherein the threshold value is based, at least in part, on a parameter that is indicative of a speed of movement.

14. The method of claim 1,
wherein the threshold value is an adaptive threshold value.

15. A mobile device for reducing power consumption and for use in a wireless communication system, wherein the mobile device comprises:
a receiver configured to:
receive a signal within a first reference sub-frame of a radio channel; and
buffer the signal;
a processor configured to:
determine whether to use the buffered signal for obtaining channel state information to be reported to a second device within a reporting sub-frame, or whether to receive and use a second signal within a second reference sub-frame of the radio channel for obtaining channel state information to be reported to the second device within a predetermined sub-frame;
process, based on the determination, the buffered signal; and
determine to report the obtained channel state information when a value representative of a variation of the obtained channel state information is below a threshold value and a value representative of channel state information reported in at least one previous reporting cycle is below the threshold value; and
a transmitter configured to:
report, based on said determination, channel state information obtained based on the buffered signal received within said first reference sub-frame, wherein the transmitter is configured to report cyclically.

16. The mobile device of claim 15,
wherein the variation is a standard deviation of the obtained channel state information over one or more channel state reporting cycles.

17. The mobile device of claim 15,
wherein the variation is a total variation of the obtained channel state information over one or more channel state reporting cycles.

18. The mobile device of claim 15,
wherein the threshold value is an adaptive threshold value.

19. The mobile device of claim 15,
wherein the adaptive threshold value is based, at least in part, on a parameter that is indicative of a velocity of the mobile device.

20. One or more non-transitory computer-readable media storing instructions that, when executed by a processor of a first device, cause the first device to:
- receive a signal within a first reference sub-frame of a radio channel;
- buffer the signal;
- reported to a second device within a reporting sub-frame, or whether to receive and use a second signal within a second reference sub-frame of the radio channel for obtaining channel state information to be reported to the second device within a predetermined sub-frame;
- process, based on the determination, the buffered signal;
- determine to report the obtained channel state information when a value representative of a variation of the obtained channel state information is below a threshold value and a value representative of channel state information reported in at least one previous reporting cycle is below the threshold value; and
- report channel state information obtained based on the buffered signal received within said first reference sub-frame, wherein the reporting is cyclical.

21. The one or more non-transitory computer-readable media of claim 20,
- wherein the variation is a first derivative of the obtained channel state information over one or more channel state reporting cycles.

* * * * *